May 10, 1955
E. M. SMITH
2,708,158
PRODUCTION OF TITANIUM
Filed Sept. 27, 1950
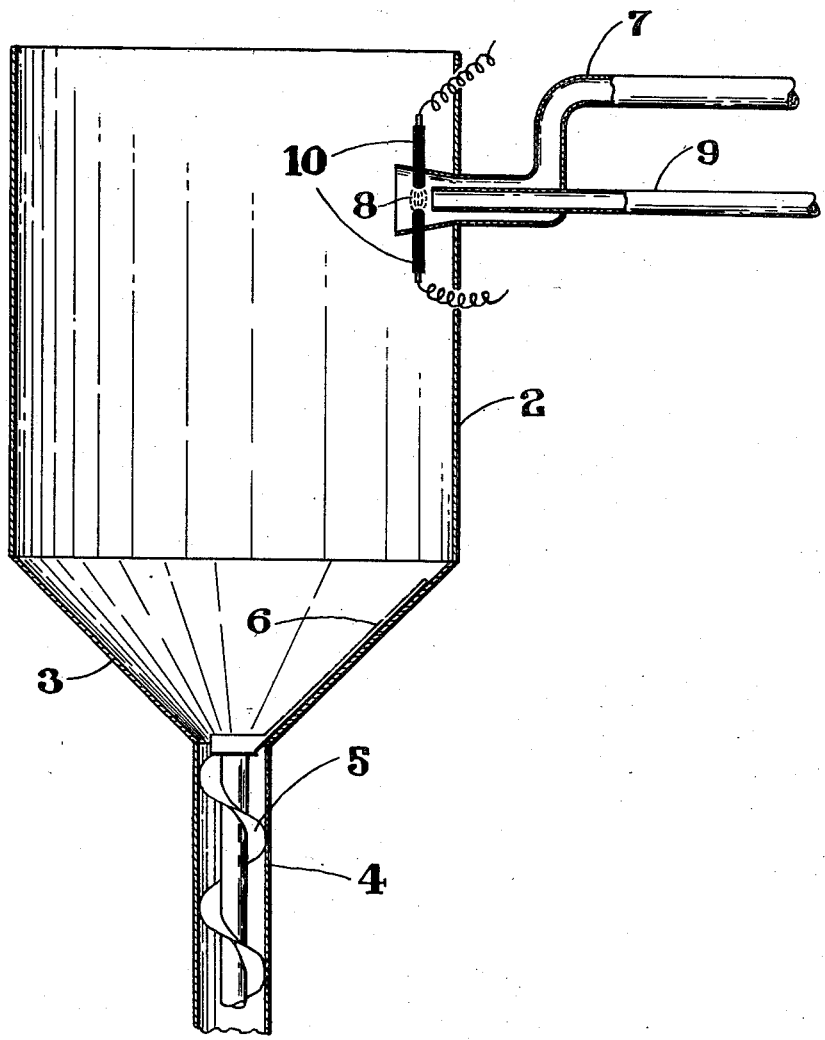
INVENTOR
EUGENE M. SMITH

2,708,158

PRODUCTION OF TITANIUM

Eugene M. Smith, Youngstown, Ohio

Application September 27, 1950, Serial No. 187,103

2 Claims. (Cl. 75—84)

This invention relates to the production of titanium and especially the production of titanium in which titanium tetrachloride is reacted with magnesium to form titanium and magnesium chloride whereafter the titanium is separated from the magnesium chloride.

Industrial demands for titanium are quite substantial yet no efficient commercial method of producing titanium has heretofore been devised. Titanium has been produced by reacting titanium tetrachloride with magnesium to form titanium and magnesium chloride and thereafter separating the titanium from the magnesium chloride. This has been done by introducing magnesium in molten form into a reaction chamber into which titanium tetrachloride vapor is also introduced. The molten magnesium reacts with the titanium tetrachloride vapor to form titanium and magnesium chloride. However, the process is inefficient, a considerable proportion of the magnesium remaining unreacted so that the unreacted magnesium as well as the magnesium chloride have to be separated from the titanium.

I have devised a method of producing titanium which for the first time attains high efficiency making feasible the production of titanium on a commercial scale so that the cost of the titanium is far below the cost of titanium produced by prior processes. I have found that it is important to efficient production of titanum that in the reaction chamber the maximum surface area of magnesium be exposed to the titanium tetrachloride vapor and that the magnesium and titanium tetrachloride be intimately admixed. I react titanium tetrachloride in vapor form with finely divided magnesium. I preferably spray the magnesium into the reaction chamber. The magnesium as sprayed into the reaction chamber is preferably in molten form. I find it desirable to use an atomizer to introduce molten magnesium into the reaction chamber.

The magnesium in finely divided form and the titanium tetrachloride vapor should be intimately admixed in the reaction chamber. The intimate admixture can be effected by separately spraying or atomizing the magnesium and the titanium tetrachloride into the reaction chamber, for example, through separate spray heads or atomizers which project the reactants into intimate association with each other. However, I have found that perhaps the most efficient way of introducing the reactants and also insuring intimate admixture thereof in the reaction chamber is to employ one of the reactants as the propellant for propelling the other into the chamber. For example, I may employ the titanium tetrachloride vapor as the propellant for propelling the magnesium spray into the chamber. Thus the reactants are in intimate admixture as they enter the space within the reaction chamber and maximum surface-to-surface contact between the reactants is brought about.

The magnesium is introduced in liquid form as then it is at a relatively high temperature (the melting point of magnesium is slightly above 1200° F.) and most efficient reaction with the titanium tetrachloride is brought about. Titanium tetrachloride vapor under pressure may be used to inject the magnesium into the reaction chamber and at the same time intimately associates or admixes with the magnesium. As the magnesium is injected into the reaction chamber it is broken up into fine particles or atomized while in contact with the titanium tetrachloride vapor under pressure acting as the propellant.

The magnesium may be supplied in the form of wire and may be melted at the spray head just as it is injected into the reaction chamber. The magnesium is in finely divided form and molten and in intimate admixture or association with the titanium tetrachloride vapor as it enters the reaction chamber. In this way I obtain unprecedented efficiency and economy. The relative quantities of magnesium and titanium tetrachloride required for the reaction (stoichiometric quantities) may be accurately predetermined and the reactants may be introduced so that an excess of unreacted magnesium is avoided. This simplifies the step of segregating the titanium and contributes largely to commercial availability of titanium at prices materially lower than prices at which titanium has heretofore been available.

My process may be carried out either as a batch process or as a continuous process. In either event the titanium formed in the reaction chamber and the magnesium chloride admixed therewith have to be separated. The separation can be effected in various ways. The separation of the titanium from the magnesium chloride does not constitute my invention. One way of effecting the separation is to introduce the titanium and magnesium chloride into a furnace where the titanium is melted and the magnesium chloride and any unreacted magnesium are volatilized and condensed. If the process is carried out as a batch process the titanium and magnesium chloride are removed from the reaction chamber in batches from time to time whereas if the process is carried out as a continuous process the titanium and magnesium chloride may be withdrawn continuously from the bottom of the reaction chamber and treated continuously in the furnace or other apparatus for segregating the titanium.

Preferably the temperature in the reaction chamber is maintained approximately in the range 1400–1600° F. This is well above the melting point of magnesium and is the range found to be conducive to most efficient reaction between magnesium and titanium tetrachloride vapor. The reaction is exothermic so it is not necessary to supply heat to the reaction chamber although if desired heat may be supplied to the reaction chamber when it is first put into use and until the heat of the reaction is sufficient to maintain it at temperature.

Other details, objects and advantages of the invention will become apparent as the following description of a present preferred method of practicing the same proceeds.

In the accompanying drawing I have illustrated one form of apparatus which may be employed in the practice of my invention, it being understood that many other forms of apparatus may be employed. The drawing shows the apparatus purely diagrammatically, no attempt being made to show in detail the various elements of the apparatus which may be units made and sold commercially by various manufacturers.

The apparatus shown diagrammatically in the drawing comprises a reaction chamber of generally cylindrical form closed at the top and sides but having at the bottom a conical chute-like portion 3 communicating with a vertical pipe 4 in which is shown a screw conveyor 5 to the upper end of which is connected a scraper 6. The screw conveyor may be driven to positively feed the reaction products downwardly to a furnace or other separating mechanism, the scraper 6 insuring continuous removal of the reaction products from the inner surface of the conical bottom 3 of the chamber.

Titanium tetrachloride vapor under pressure is introduced through a pipe 7 and enters the reaction chamber 2 through an atomizer indicated purely diagrammatically at 8. Magnesium in wire form is fed continuously through a pipe 9 to the atomizer 8, being melted by an arc drawn between electrodes 10 just as it reaches the atomizer. The titanium tetrachloride vapor under pressure acts as the propellant for atomizing the molten magnesium and injecting it into the reaction chamber 2. At the same time the titanium tetrachloride vapor and the atomized molten magnesium are intimately admixed whereby highly efficient reaction therebetween is brought about. Moreover, as above indicated, the quantities of titanium tetrachloride and magnesium which are fed to the atomizer 8 may be accurately predetermined so that an excess of magnesium is avoided. In all prior processes a substantial excess of magnesium which remains unreacted has been employed greatly increasing the cost of producing titanium both because of the added amount of magnesium supplied and because of the added expense of segregation of the titanium.

As above explained, the temperature in the reaction chamber 2 is preferably maintained in about the range 1400–1600° F. An inert atmosphere may be introduced into the reaction chamber. Argon may be employed as the inert atmosphere.

While I have shown diagrammatically an electric arc within the reaction chamber for melting the magnesium the magnesium may be melted otherwise and the melting may be effected outside the reaction chamber. The magnesium may be supplied to the atomizer in powder form in which case it may be rendered molten before or as it reaches the atomizer.

A plurality of atomizers may be utilized in the same reaction chamber if desired. The titanium tetrachloride and magnesium may be introduced by separate atomizers.

Control of the pressure in the reaction chamber is simplified as the pressure may be controlled simply by controlling the rate of feed of the reactants.

The titanium produced by my process is desirably ductile and suitable for all commercial uses.

While I have described a present preferred method of practicing the invention it is to be distinctly understood that the invention is not limited thereto but may be otherwise variously practiced within the scope of the following claims.

I claim:

1. A process of producing titanium comprising reacting titanium tetrachloride with magnesium by continuously introducing titanium tetrachloride vapor under pressure into a reaction chamber in which the temperature is maintained approximately in the range 1400–1600° F., continuously feeding to the entrance to the reaction chamber magnesium in solid state in a mass of substantially constant cross-section in accurately predetermined mass rate relatively to the mass of the titanium tetrachloride vapor so that an excess of unreacted magnesium is avoided, melting the magnesium substantially at the entrance to the reaction chamber, spraying the molten magnesium into the reaction chamber, in the reaction chamber bringing the magnesium spray into intimate contact with the titanium tetrachloride vapor and thereby continuously forming titanium and magnesium chloride, and separating the titanium from the magnesium chloride.

2. A process of producing titanium comprising reacting titanium tetrachloride with magnesium by continuously introducing titanium tetrachloride vapor under pressure into a reaction chamber in which the temperature is maintained approximately in the range 1400–1600° F., continuously feeding to the entrance to the reaction chamber magnesium in wire form in accurately predetermined mass rate relatively to the mass of the titanium tetrachloride vapor so that an excess of unreacted magnesium is avoided, melting the magnesium wire substantially at the entrance to the reaction chamber, spraying the molten magnesium into the reaction chamber, in the reaction chamber bringing the magnesium spray into intimate contact with the titanium tetrachloride vapor and thereby continuously forming titanium and magnesium chloride, and separating the titanium from the magnesium chloride.

References Cited in the file of this patent

UNITED STATES PATENTS

| | | |
|---|---|---|
| 1,306,568 | Weintraub | June 10, 1919 |
| 1,695,041 | Elmen | Dec. 11, 1928 |
| 2,091,087 | Wempe | Aug. 24, 1937 |
| 2,205,854 | Kroll | June 25, 1940 |
| 2,405,580 | Jackson | Aug. 13, 1946 |
| 2,556,763 | Maddex | June 12, 1951 |
| 2,618,549 | Glasser et al. | Nov. 18, 1952 |

FOREIGN PATENTS

| | | |
|---|---|---|
| 253,161 | Great Britain | June 7, 1926 |
| 827,315 | France | Jan. 24, 1938 |
| 296,867 | Germany | Mar. 13, 1917 |

OTHER REFERENCES

Journal of Metals, April 1950; pages 634–640, inclusive.